May 12, 1942. W. H. DUNN 2,282,310
COMBINED PORTABLE VISE AND VISE MOUNTING
Filed Nov. 22, 1940
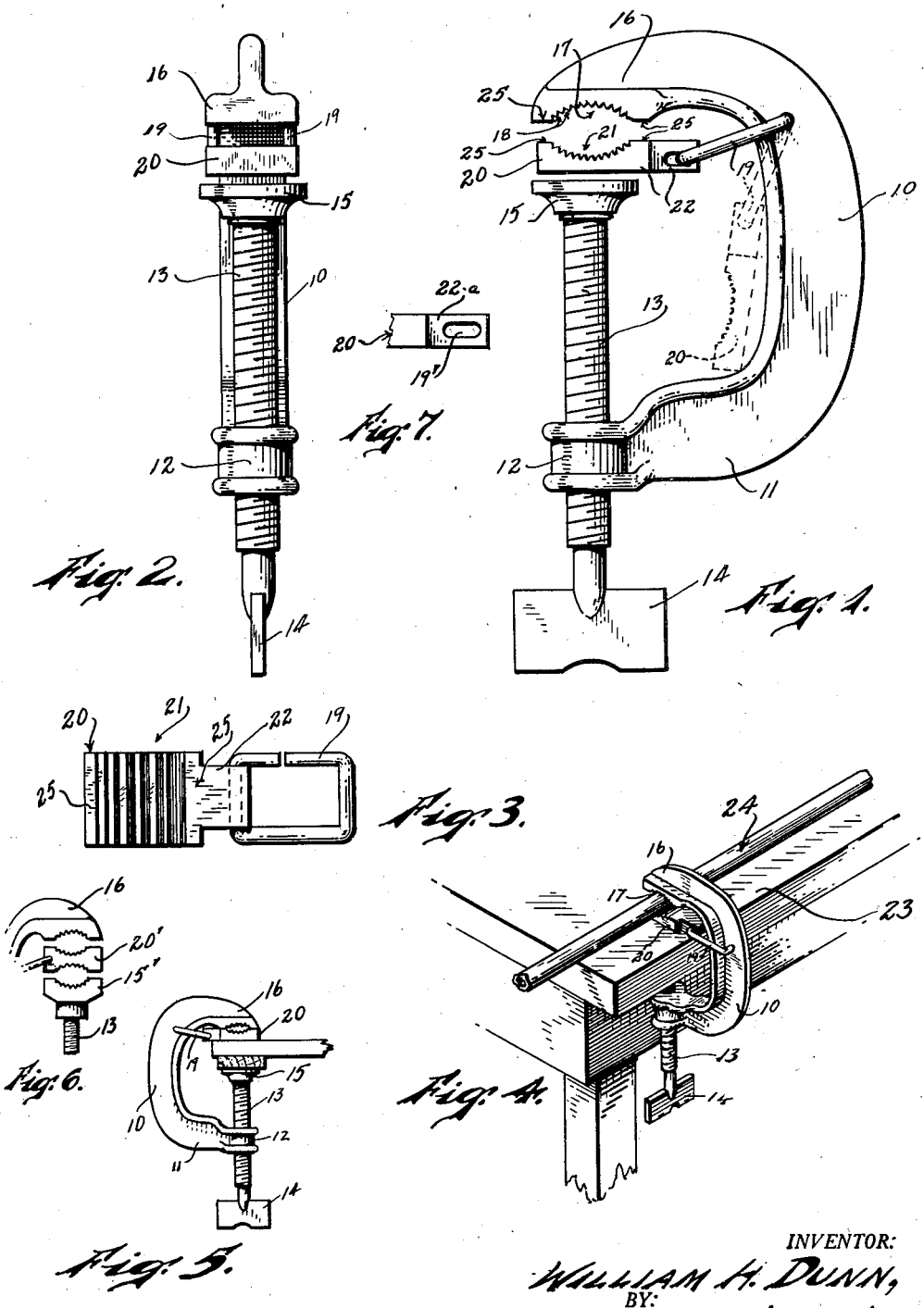
INVENTOR:
WILLIAM H. DUNN,
BY:
Horace Woodward,
ATTORNEY.

Patented May 12, 1942

2,282,310

UNITED STATES PATENT OFFICE 2,282,310

COMBINED PORTABLE VISE AND VISE MOUNTING

William H. Dunn, Floral Park, N. Y.

Application November 22, 1940, Serial No. 366,768

2 Claims. (Cl. 81—41)

The invention has for an object to provide an appliance which may be used in the same manner as ordinary C-clamps for holding parts together, and which may also be used as a vise, for holding pipe or other round objects, or objects of other shapes by the use of a single operating screw.

It is a special aim of the invention to provide a device of this kind which may be clamped upon the projecting edge of a bench or table, and which will include a pair of jaws operable by the same screw that clamps the device on such bench or table, to clamp work upon which tooling is to be done.

It is further special aim of the invention to present such a device which will be extremely low in cost, and which will involve a minimum of complication in production and use. It is an important aim of the invention to enable the device to be used for clamping smooth-faced work without injury to the surface thereof, when desired, while at the same time serving the advantages of a pipe clamp or vise.

Another important aim of the invention is to present a device which may be also used as a vise which may be mounted upon a pipe fixed in place in water or other systems, and a piece of work clamped at the same time between separate faces from those by which it is mounted upon the pipe, thus serving as a portable vise useful for plumbers, electricians, and others without requiring special stands.

Additional objects, advantages and features of invention reside in the construction, arrangement and combination of parts involved in the embodiment of the invention, as will be more readily understood from the following description and accompanying drawing, wherein Figure 1 is a side elevation of a clamp, full size, embodying my invention, although it may be made in various sizes to suit the services to which it is to be applied.

Figure 2 is a front edge view thereof.

Figure 3 is a view of the intermediate jaw and mounting link, detached.

Figure 4 is a perspective view of the article applied to a work-bench.

Figure 5 is a side elevation of the device in use as a simple clamp on screw work.

Figure 6 is a similar fragmentary view showing a modification of the device.

Figure 7 is a fragmentary elevation of the floating jaw, detached.

There is illustrated a substantially C-shaped frame 10, having a base arm 11 at the outer end of which there is formed a nut or internal screw head 12, through which an operative screw 13 is engaged, having a wing handle 14 by which it may be operated manually. At the inner end of the screw there is a swivel-head 15, having a planiform work-engaging face, the head 15 being mounted in any usual manner upon the end of the screw to permit turning of the screw and a universal pivotal action of the head 15 thereon, if desired, the details of this connection not being illustrated, as these are well understood in the art.

The bight portion of the frame is considerably elongated, being nearly rectilinear and substantially parallel to the screw 13.

At the outer end of the frame, a fixed jaw 16 is formed, which in the present case is formed with a transverse recess 17 curved suitably to fit against the side of a pipe and to receive the pipe in the recess as is common in pipe vises and the like, the recess being formed with suitable teeth 18 by which the pipe rested therein may be gripped and held against rotation when under sufficient pressure.

By means of a link 19 pivoted on the bight portion of the frame 10 and spaced longitudinally inward from the base of the jaw 16 a short distance, a floating jaw 20 is mounted, comprising a block of suitably hardened metal having a recess 21 complementary to the recess 17 before described, and correspondingly toothed, the block having an inward extension 22 transversely apertured and receiving the outer portion of the link 19 therethrough, so that the latter is pivoted in the inner end of the floating jaw. The side of the jaw opposite the recess 21 is finished smoothly and planiformly, for purposes which will be described. The length of the jaw 20 and link are such that the two may be swung downward to lie close to the bight of the frame, as dotted in Figure 1. For this purpose the length of the jaw 20 is such that when the link has been swung against the bight, the outer end of the jaw 20 will clear the head 15 when retracted, and may be swung close against the bight, so as to be clear of work coengaged between the head 15 and jaw 16.

In the use of the article, if it is to be used as a clamp upon smooth work, the work is inserted between the head 15 and the smooth face of the floating jaw 20, and the screw 13 operated until the jaw 20 is brought against the jaw 16 by pressure of the head 15 against the work, until the work is clamped in the manner shown in Figure 5. If it is desired to use the article as a pipe vise, however, the screw 13 being operated to withdraw it from the jaw 16 a suitable distance, the edge of a a table, bench, or other support, as at 23, is inserted between the head 15 and the jaw 20, with the screw located below the support and withdrawn sufficiently to permit the frame 10 to be lifted so that the clearance between the jaw 16 and the floating jaw 20 will permit insertion of a pipe or the like, as at 24. The screw 13 is then tightened by operation of the winghead 14 until both the support 23 and the work 24 are securely clamped, the first being held between the smooth faces of the head 15 and the jaw 20, while the work is clamped between the jaws 20 and 16, as shown.

If it is desired to mount the device upon a pipe so as to be used to hold work of various kinds, the device is engaged with the pipe in the same manner as first described, but engaged with a pipe which has been fixed in position so as to afford a suitable support, while the work to be held is then inserted between the head 15 and jaw 20, where it may be clamped by tightening the screw, at the same time that the vise is fixed upon the supporting pipe. For special work, the jaw 20 may have pipe-engaging teeth on both sides, as at 20' in Figure 6, while the pivotal head may be likewise formed with a head-engaging recess, as shown at 15' in the same view as last mentioned, the parts being otherwise the same as before described. Also, if desired, the opposed jaw faces 25 of the members 16 and 20 that lie outwardly of the recesses 17 and 21 may be used for holding flat work, if desired. These surfaces may be made in suitable proportions to adapt the device to the various uses contemplated, as will be readily understood.

While I have shown and described a specific embodiment of the invention in great detail, it will be understood that the form of the parts, their proportions, and relation in combination may be varied provided they do not depart from the scope of the claims.

If desired, the aperture through which the link 19 is pivoted in the floating jaw may be elongated, so that the jaw may accommodate itself more readily to various sizes of pipe, as shown in Figure 7, where the rear extension 22—a of the jaw is formed with an elongated opening 19', in which the end of the link 19 may have a certain amount of movement, so that the jaw may always have its recess 21 opposed and registered with the recess 17 while engaging pipes of different sizes.

In cases where a piece of work is formed with such shape that may be best coengaged directly by the head 15 and the jaw 16, or in case for any other reason it is desired to clamp a support or piece of work directly between the head 15 and the jaw 16, the screw 13 may be withdrawn sufficiently to permit the link 19 and floating jaw 20 to swing clear of the head 15 toward the intermediate portion of the frame 10, so that the floating jaw may lie free of the screw and head 15 while the head 15 is moved toward the jaw 16 for such direct clamping of work as may be required.

I claim:

1. A portable combined vise and vise mounting consisting of a C-shaped frame, one arm thereof constituting a fixed laterally extended jaw and having a work-engaging face on its inner side at the end thereof, the other arm of the frame having an internal screw at its end alined with the work-engaging face of the jaw, a screw engaged therethrough in line with the said work-engaging face and having on its end a work-engaging head opposed to said jaw, and a floating jaw between said head and said face of the jaw first named, said floating jaw having work-engaging faces on opposite sides opposed to the screw head and said first named jaw respectively, and a swinging link connecting between the bight of the frame and the floating jaw, whereby work and support elements may be simultaneously engaged between the screw and first jaw at respective sides of the floating jaw, the floating jaw being movable on the link to clear the screw head in open position of the vise and to lie within the frame clear of work.

2. The structure of claim 1 in which the bight of the frame is elongated substantially parallel to the screw, said floating jaw being of a length less than the distance from the bight of the frame to the work-engaging head of the screw, and said link being pivoted near one end of the bight and having a radius of movement at its end connected to the floating jaw to swing close to the bight intermediately of the length of the latter, whereby the floating jaw may lie within the frame clear of the fixed jaw and screw head and of work coengaged between the two last named.

WILLIAM H. DUNN.